US008856173B2

(12) United States Patent
Charytoniuk

(10) Patent No.: US 8,856,173 B2
(45) Date of Patent: Oct. 7, 2014

(54) USER ENGAGEMENT IN A SOCIAL NETWORK USING INDICATIONS OF ACKNOWLEDGEMENT

(71) Applicant: Google Inc., Mountain View, CA (US)

(72) Inventor: Tomasz Charytoniuk, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/644,715

(22) Filed: Oct. 4, 2012

(65) Prior Publication Data

US 2014/0101197 A1    Apr. 10, 2014

(51) Int. Cl.
 G06F 7/00     (2006.01)
 G06F 17/30    (2006.01)
 G06Q 50/00    (2012.01)

(52) U.S. Cl.
 CPC .......... *G06F 17/30867* (2013.01); *G06Q 50/01* (2013.01)
 USPC ....................................... 707/770

(58) Field of Classification Search
 None
 See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2007/0127631 A1 | 6/2007 | Difiglia | |
| 2007/0171898 A1 | 7/2007 | Salva | |
| 2007/0173236 A1 | 7/2007 | Vishwanathan et al. | |

(Continued)

FOREIGN PATENT DOCUMENTS

WO    WO0279984    10/2002

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Jay Morrison
(74) *Attorney, Agent, or Firm* — Patent Law Works LLP

(57) ABSTRACT

A method and system for enhancing and incentivizing user engagement with indications of acknowledgement at a social network is described. An acknowledgement application receives indications of acknowledgement associated with at least one information item from a first user and at least one second user at a social network. The acknowledgement application aggregates and processes the indications of acknowledgement. The acknowledgement application provides at least one result from the processing in response to hovering over an option for the indications of acknowledgement associated with the at least one information item. The acknowledgement application rewards the first user at least one numerical point based on indications of acknowledgement associated with the at least one specific topic and provides at least one badge of achievement to the first user on accumulating at least one threshold of a total number of points.

20 Claims, 9 Drawing Sheets

(56) References Cited

U.S. PATENT DOCUMENTS

| | | | |
|---|---|---|---|
| 2007/0244867 A1* | 10/2007 | Malandain et al. | 707/3 |
| 2007/0248077 A1 | 10/2007 | Mahle, Jr. et al. | |
| 2008/0056475 A1 | 3/2008 | Brannick et al. | |
| 2008/0065514 A1* | 3/2008 | Eaton | 705/27 |
| 2008/0154915 A1 | 6/2008 | Flake et al. | |
| 2008/0192656 A1 | 8/2008 | Vagelos | |
| 2009/0326970 A1 | 12/2009 | Estrada et al. | |
| 2010/0023878 A1 | 1/2010 | Douris et al. | |
| 2010/0083170 A1 | 4/2010 | Lim et al. | |
| 2010/0145608 A1 | 6/2010 | Kurtti et al. | |
| 2011/0098156 A1 | 4/2011 | Ng et al. | |
| 2011/0161987 A1 | 6/2011 | Huang | |
| 2012/0109966 A1* | 5/2012 | Liang et al. | 707/740 |
| 2012/0271829 A1* | 10/2012 | Jason | 707/740 |
| 2013/0018838 A1* | 1/2013 | Parnaby et al. | 706/52 |
| 2013/0018916 A1* | 1/2013 | Busch et al. | 707/771 |
| 2013/0018957 A1* | 1/2013 | Parnaby et al. | 709/204 |
| 2013/0212091 A1* | 8/2013 | Hoffman et al. | 707/728 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.
Anwar et al., "Leveraging 'Social-Network' Infrastructure to Improve Peer-to Peer Overlay Performance: Results from Orkut," University of Illinois at Urbana-Champaign USA, 2005, 9 pgs.
AT&T Personal Reach Service: Benefits and Features, Mar. 29, 2010, 7 pgs.
AT&T Personal Reach Service: Personal Reach Service, Mar. 29, 2010, 2 pgs.
Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.
Boyd, et al., "Social Network Sites: Definition, History, and Scholarship," Journal of Computer-Mediated Communication, International Communication Association, 2008, pp. 210-230.
Churchill et al., "Social Networks and Social Networking," IEEE Computer Society, Sep.-Oct. 2005, pp. 14-19.
Cohen et al., "Social Networks for Creative Collaboration," C&C '05, Apr. 12-15, 2005, London, United Kingdom, pp. 252-255.
Decker et al., "The Social Semantic Desktop," Digital Enterprise Research Institute, DERI Galway, Ireland, DERI Innsbruck, Austria, DERI Technical Report, May 2, 2004, 7 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, Oct. 23, 2005, 8 pgs.
International Search Report, International Application No. PCT/US2008/005118, Sep. 30, 2008, 2 pgs.
Leonard, "You Are Who You Know," Internet, retrieved at http://www.salon.com, Jun. 15, 2004, 15 pgs.
LiveJournal, "Faq #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
O'Murchu et al., "Online Social and Business Networking Communities," Digital Enterprise Research Institute DERI Technical Report, National University of Ireland, Aug. 11, 2004, 22 pgs.
Ring Central, Inc., Internet, retrieved at http://www.ringcentral.com, Apr. 19, 2007, 1 pg.
Singh et al., "Cinema: Columbia InterNet Extensible Multimedia Architecture," Department of Computer Science, Columbia University, May 2002, pp. 1-83.
Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twitter, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.
International Search Report and Written Opinion for PCT Application No. PCT/US13/63508, dated Dec. 19, 2013, 13 pages.

* cited by examiner

Figure 3B

USER ENGAGEMENT IN A SOCIAL NETWORK USING INDICATIONS OF ACKNOWLEDGEMENT

BACKGROUND

The disclosure relates to enhancing user interactions with indications of acknowledgement in a social network.

Social network users are inundated with information on various topics. Users can recommend and share the information they find interesting to their connections on a social network. As they continue to share and recommend information on a topic, users develop a level of expertise in the topic that their connections can come to rely on. Existing social networks let social network users recommend and share information but fail to make the recommending and sharing more engaging to the social network users.

SUMMARY

In general, one innovative aspect of the subject matter described in this disclosure may be embodied in methods that include receiving at the social network indications of acknowledgement associated with at least one information item from a first user and a second user, aggregating the indications of acknowledgement associated with the at least one information item relating to a topic, receiving search terms from a third user that correspond the topic, providing the indications of acknowledgement to the third user and providing to the first user a number of times that the indications of acknowledgement from the first user appeared in association with search terms that correspond to the topic. Other implementations of one or more of these aspects include corresponding systems, apparatus, and computer programs, configured to perform the actions of the methods, encoded on computer storage devices.

These and other implementations may each optionally include one or more of the following features. For instance, the operations further include: generating a geographical map including at least a first location associated with the first user and a second location associated with the second user giving the indications of acknowledgment, generating a graph plotting a total number of indications of acknowledgment received from the first user and the second user over time, distributing at least one point to the first user based on the indications of acknowledgement and sharing of the at least one information item relating to the topic to the social network, providing at least one badge of achievement to the first user based on reaching at least one threshold of a total number of points, providing for display on a social network profile page associated with the first user at least one badge of achievement and a graphical progress bar that indicates progress toward reaching the at least one threshold of a total number of points, providing for display on the social network profile page associated with the first user a first counter for a number of indications of acknowledgement received from the second user and a second counter for a number of times the at least one information item posted by the first user is being shared by the second user on the social network and identifying a name of the first user in proximity of the at least one information item relating to the topic based on the at least one badge of achievement received by the first user.

For instance, the features include: the first user and the second user being followed by the third user according to a social graph and the indications of acknowledgement being provided to the third user including an identity of the first user and the second user, the search terms received from a search engine and responsive to the search engine receiving the indications of acknowledgement, generating search results that include the indications of acknowledgement, distributing to the first user at least one point responsive to receiving the indications of acknowledgement from the first user for the at least one information item relating to the topic and distributing to the first user at least one point responsive to receiving the indications of acknowledgement on the at least one information item shared to the social network from the at least one second user, and the indications of acknowledgement from the first user being received from the first user providing a physical indication of acknowledgement.

The disclosure is advantageous because it has a unique mechanism to enhance and incentivize user engagement with indications of acknowledgement. The enhancement of user engagement is executed by processing indications of acknowledgement associated with an information item and providing information associated with the information item for insight. For example, a graph plotting the total number of indications received over time. The incentivizing of user engagement is executed by rewarding the users for providing indications of acknowledgement on a topic with achievement badges and virtual rewards.

BRIEF DESCRIPTION OF THE DRAWINGS

The specification is illustrated by way of example, and not by way of limitation in the figures of the accompanying drawings in which like reference numerals are used to refer to similar elements.

FIG. 3B is a graphic representation of an example user interface for displaying information about indications of acknowledgement on a third-party website.

DETAILED DESCRIPTION

A system and method for enhancing user engagement with indications of acknowledgement at a social network is described below.

Figure 1:
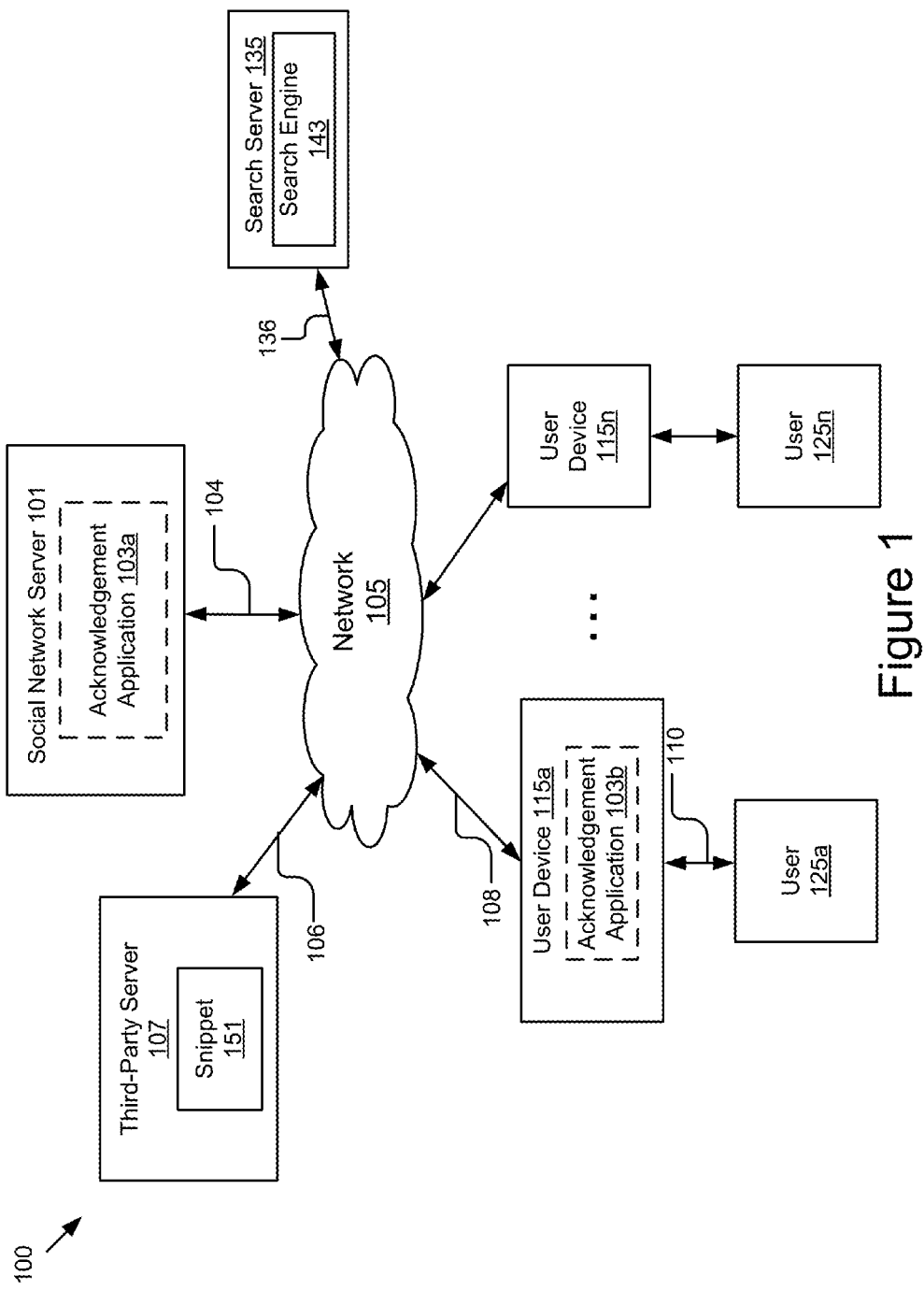
FIG. 1 is a block diagram illustrating an example system for managing indications of acknowledgement in a social network.

FIG. 1 illustrates a block diagram of a system 100 for aggregating, processing and providing information associated with indications of acknowledgement in a social network according to some instances. The indication of acknowledgement includes, for example, approval, disapproval, a like, a dislike, a thumbs up or a thumbs down. The system 100 includes user devices 115a, 115n that can be accessed by users 125a, 125n, a social network server 101, a third-party server 107 and a search server 135. In FIG. 1 and the remaining figures, a letter after a reference number, such as "115a" is a reference to the element having that particular reference number. A reference number in the text without a following letter, such as "115," is a general reference to any or all instances of the element bearing that reference number. In the illustrated system, these entities can be communicatively coupled via a network 105. Although only two devices are illustrated, a large number of user devices 115n may be available to a number of users 125n. Furthermore, while only one network 105 is coupled to the user devices 115a, 115n, the social network server 101, the third-party server 107 and the search server 135, in practice a large number of networks 105 can be connected to the entities.

In some instances, the acknowledgement application 103a can be operable on the social network server 101, which is coupled to the network 105 via signal line 104. The social network server 101 also contains a social network application (not shown) that generates a social network and includes storage (not shown) for maintaining a record of users and their relationships to each other, e.g. a social graph. Although only one social network server 101 is shown, multiple servers may be present.

In some instances, a snippet 151 can be stored on a third-party server 107, which is communicatively connected to the network 105 via signal line 106. The third-party server 107 includes an application for generating a third-party website (not shown). The snippet 151 can be code or routines configured to enable the software included in the third-party server 107 to communicate with the acknowledgement application 103 so that the software can use the service provided by the acknowledgement application 103. For example, the snippet 151 communicates with the acknowledgement application 103 to generate an icon of the indication of acknowledgement and to incorporate it within the third-party website for users visiting the third-party website to indicate acknowledgement on at least one information item present in the third-party website. In some instances, the snippet 151 includes Hyper-Text Markup Language code ("HTML code") that can be configured to communicate with the acknowledgement application 103 to exchange data, information and/or commands. In other instances, the snippet 151 includes code from a group of C, C++, Java, CSS and PHP. Furthermore, while only one snippet 151 is shown in the third-party server 107, the third-party server 107 could include one or more snippets 151. Similarly while only one third-party server 107 is shown, the system 100 can include one or more third-party servers 107.

In some instances, the acknowledgement application 103b can be stored on a user device 115a, which is connected to the network 105 via signal line 108. The user 125a interacts with the user device 115a via signal line 110. The user device 115a, 115n can be a computing device. For example, the user device 115a, 115n may be a personal computer ("PC"), a cell phone (e.g., a smart phone, a feature phone, a dumb phone, etc.), a tablet computer (or tablet PC), a laptop, a portable game player, a portable music player, a television with one or more processors embedded therein or coupled thereto or any other electronic device capable of accessing a network. In some instances, the system 100 includes a combination of different types of user devices 115a, 115n. For example, a first user device 115a may be a smart phone, a second user device may be a personal computer and a plurality of other user devices 115n may be a combination of a personal computer, a smart phone and a tablet computer. The acknowledgement application 103 can be stored in one or more combinations on the devices and servers. Furthermore, while only one third-party server 107 is shown, the system 100 can include one or more third-party servers 107.

The network 105 is a conventional type, wired or wireless, and may have any number of configurations, for example, a star configuration, token ring configuration or other configurations. Furthermore, the network 105 may comprise a local area network (LAN), a wide area network (WAN) (e.g., the Internet), and/or any other interconnected data path across which multiple devices may communicate. In some instances, the network 105 may be a peer-to-peer network. The network 105 may also be coupled to or includes portions of a telecommunications network for sending data in a variety of different communication protocols. In some instances, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

The acknowledgement application 103 enhances and incentivizes user engagement with indications of acknowledgement. The acknowledgement application 103 receives indications of acknowledgment, aggregates and processes the indications of acknowledgment in the social network. In some instances, the acknowledgement application 103 provides at least one result from the processing to a user in response to moving an arrow to hover over an icon of the indication of acknowledgement associated with an information item. The information item includes, for example, a webpage on a third-party website and items within the social network, for example, a post, an image, a video, a check-in and a reference to a webpage (either a direct reference or a reshare). In some instances, the acknowledgement application 103 distributes to the user numerical points for indicating or receiving indications of acknowledgement on one or more information item associated with a topic. In other instances, the acknowledgement application 103 provides a badge of achievement to the user on accumulating a threshold of total number of points.

Figure 2:
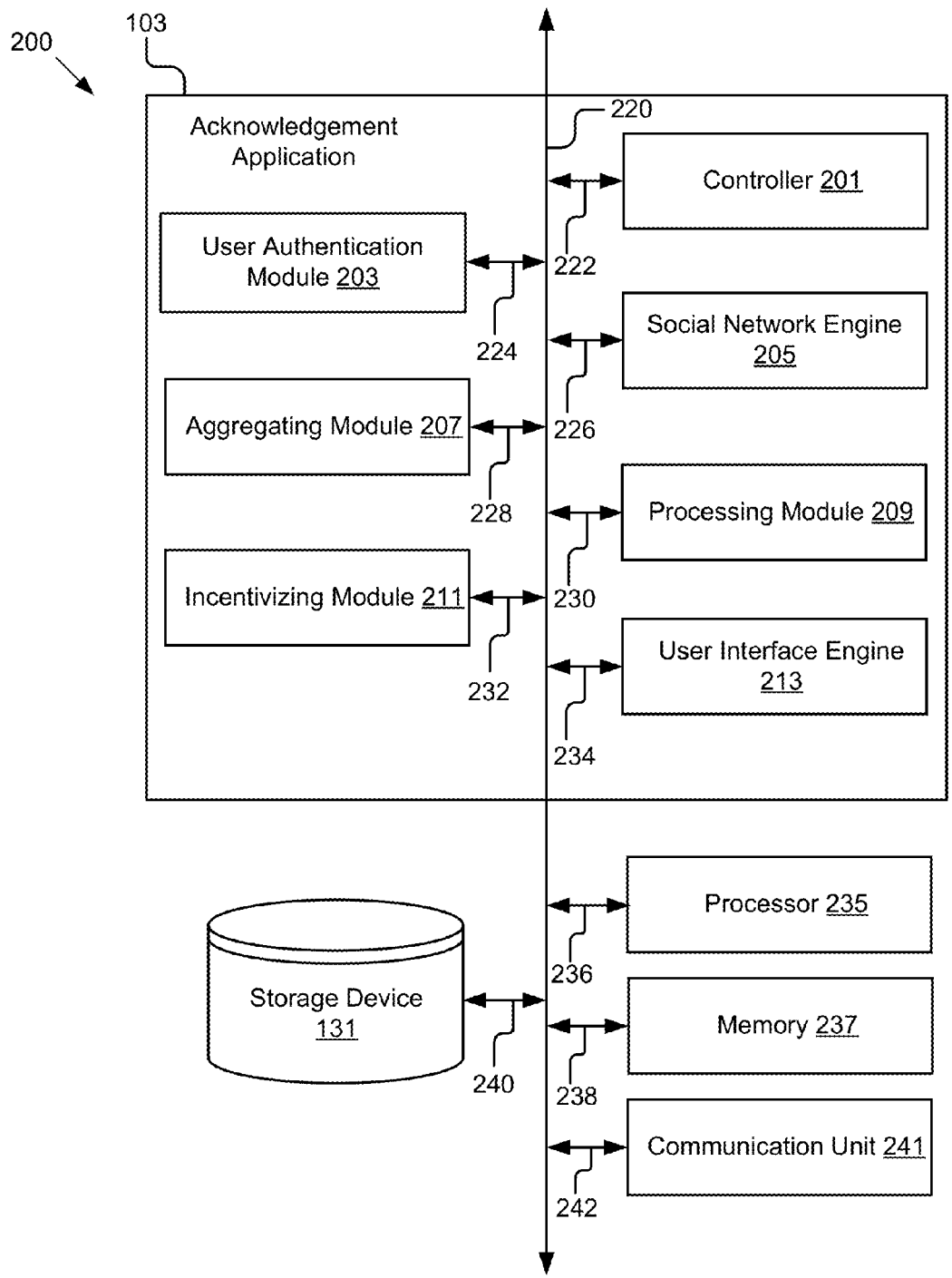
FIG. 2 is a block diagram illustrating an example system of an acknowledgement application.

Referring now to FIG. 2, the acknowledgement application 103 is shown in more detail. FIG. 2 is a block diagram of a computing device 200 that includes the acknowledgement application 103, a memory 237, a processor 235, a storage device 131 and a communication unit 241. Optionally, the computing device 200 can be a social network server 101. In some instances, the computing device 200 can be a third-party server 107. In other instances, the computing device 200 may be a user device 115a.

The processor 235 includes an arithmetic logic unit, a microprocessor, a general purpose controller or some other processor array to perform computations and provide electronic display signals to a display device. The processor 235 can be coupled to the bus 220 for communication with the other components via signal line 236. Processor 235 processes data signals and may include various computing architectures including a complex instruction set computer (CISC) architecture, a reduced instruction set computer (RISC) architecture, or an architecture implementing a combination of instruction sets. Although only a single processor is shown in FIG. 2, multiple processors may be included. In some instances, the processing capability may be limited to supporting the display of images and the capture and transmission of images. In other instances, the processing capability might be enough to perform more complex tasks, including various types of feature extraction and sampling. It may be obvious that other processors, operating systems, sensors, displays and physical configurations may be possible.

The memory 237 stores instructions and/or data that may be executed by the processor 235. The memory 237 can be coupled to the bus 220 for communication with the other components via signal line 238. The instructions and/or data may include code for performing any and/or all of the techniques described herein. The memory 237 may be a dynamic random access memory (DRAM) device, a static random access memory (SRAM) device, flash memory or some other memory device known in the art. In some instances, the memory 237 may also include a non-volatile memory or similar permanent storage device and media. For example, a hard disk drive, a floppy disk drive, a CD-ROM device, a DVD-ROM device, a DVD-RAM device, a DVD-RW device, a flash memory device, or some other mass storage device known in the art for storing information on a more permanent basis.

The storage device 131 is a non-transitory memory that stores data necessary for the functionality of the acknowledgement application 103. The storage device 131 can be communicatively coupled by the bus 220 for communication with the other components of the computing device 200 via signal line 240. The data stored in the storage device 131 includes indications of acknowledgement, gamification information and a social graph. The indications of acknowledgement may be a list (or a database) of indications of acknowledgement associated with authenticated users. For example, indications of acknowledgement include endorsements of websites or parts of websites visited by an authenticated user. The phrase social graph can be a file that includes the relationships between users in a social network. The gamification information may be a repository for storing game design techniques and mechanics to encourage user engagement to provide indications of acknowledgement and production of quality user-generated content.

The communication unit 241 receives data from a third-party server 107, a social network server 101, a search server 135 or another user device 115n. The communication unit 241 transmits the data to the acknowledgement application 103. The communication unit 241 can be coupled to the bus 220 via signal line 242. In some instances, the communication unit 241 includes a port for direct physical connection to the network 105 or to another communication channel. For example, the communication unit 241 includes a USB, SD, CAT-5 or similar port for wired communication with the network 105. In some instances, the communication unit 241 includes a wireless transceiver for exchanging data with the network 105, or with another communication channel, using one or more wireless communication methods, such as IEEE 802.11, IEEE 802.16, BLUETOOTH®, near field communication (NFC) or another suitable wireless communication method. In other instances, the communication unit 241 includes a NFC chip that generates a radio frequency (RF) for short-range communication.

In some instances, the acknowledgement application 103 includes a controller 201, a user authentication module 203, a social network engine 205, an aggregating module 207, a processing module 209, an incentivizing module 211 and a user interface engine 213.

The controller 201 can be software including routines for receiving data via the communication unit 241, routing the data to the appropriate engine or module and transmitting responses from modules or engines to the communication unit 241 for transmission to the user device 115, the third-party server 107, the search server 135 or the social network server 101. In some instances, the controller 201 can be a set of instructions executable by the processor 235 to provide the functionality described below for managing data. In other instances, the controller 201 can be stored in the memory 237 of the computing device 200 and can be accessible and executable by the processor 235. In either of the instances, the controller 201 can be coupled to the bus 220 and adapted for cooperation and communication with the processor 235, the memory 237, the user authentication module 203, the aggregating module 207, the user interface engine 213 and other components of the computing device 200 via signal line 222.

The controller 201 receives information via the communication unit 241 from a user device 115. The controller 201 identifies the type of data being received and transmits the data to the appropriate module or engine. For example, the controller 201 receives data for creating a post on the social network from a user device 115 and sends the data to the social network engine 205. In some instances, the controller 201 receives indications of acknowledgement (for example, approve, disapprove, like, dislike, thumbs up, thumbs down) at the social network for at least one information item via a user device 115 and transmits the indications of acknowledgement to the aggregating module 207. The indications of acknowledgement may be data including explicit signaling of interest in at least one information item found online or in the physical world. For example, a user clicks on the button for the indications of acknowledgement, usually in the form of text or an image, associated with a search engine result. After the user clicks on the button for the indications of acknowledgement, the controller 201 sends information associated with the indication of acknowledgement to the aggregating module 207.

The user authentication module 203 can be code and routines for receiving a login request for authentication from a requesting user. In some instances, the user authentication module 203 can be a set of instructions executable by the processor 235 to provide the functionality described below for authenticating the login request. In other instances, the user authentication module 203 can be stored in the memory 237 of the computing device 200 and can be accessible and executable by the processor 235. In either of the instances, the user authentication module 203 can be coupled to the bus 220 and adapted for cooperation and communication with the processor 235, the storage device 131 and other components of the computing device 200 via signal line 224.

In some instances, the user authentication module 203 receives a login request including login information from a requesting user for authentication. For example, the user authentication module 203 receives a login request from the requesting user for logging into a social network. The user authentication module 203 identifies the requesting user based at least in part on the login information associated with the login. The login information associated with the login can include, but is not limited to, a user name and/or a password, a user alias, an email address, a retina scan of a user, a fingerprint swipe of a user, an electronic identifier, magnetic badge swipe or other similar forms of user identifier information. In addition, the user authentication module 203 receives secondary information including, but not limited to, the internet protocol (IP) address of the user device 115 from which the login request is originating from, the device identification number of the user device 115 being used to request login from, and/or the location of the user device 115 from which the login request is originating from, including the state and/or country, and verified browser cookies.

In some instances, if the login request for authentication does not include a correct user name and password, the login request is denied. In other instances, the user authentication module 203 is used in account recovery when the account owner has forgotten his, or her, username and/or password. In some instances, the user authentication module 203 detects a potentially fraudulent authentication by analyzing the secondary information included in the login request. For example, if the IP address associated with the login request is an IP address of a "blacklisted" user, or a suspected bot, the user authentication module 203 identifies the login request as potentially fraudulent. The user authentication module 203 detects a potentially fraudulent authentication by comparing the secondary information to historical authentication information of the account owner. For example, if the login request for authentication originates from a country, or device, that the requesting user has not attempted to send login requests from before, the user authentication module 203 identifies the login request as potentially fraudulent. In some instances, a potentially fraudulent authentication attempt includes a failed authentication attempt.

The social network engine 205 can be software including routines for generating and managing a social network. In some instances, the social network engine 205 can be a set of instructions executable by the processor 235 to provide the functionality described below for generating and managing a social network. In other instances, the social network engine 205 can be stored in the memory 237 of the computing device 200 and can be accessible and executable by the processor 235. In either of the instances, the social network engine 205 can be coupled to the bus 220 and adapted for cooperation and communication with the processor 235, the storage device 131, the controller 201, the user interface engine 213 and other components of the computing device 200 via signal line 226.

A social network can be a type of social structure where the relationships between the users 125 are included in a social graph. In some instances, the social graph includes a social affinity between users. For example, when a first user follows a second user, they have a first-degree relationship. When the second user follows a third user that the first user does not follow, the first user has a second-degree relationship with the third user. The lower the degree of separation between users, the more they share social affinity. In some instances, social affinity is also a measure of how many people are connected between users. For example, two users that are associated with the same five people could have a higher affinity than two users that are both associated with only one person.

The social network engine 205 manages the social network by handling account registration, publication of content (e.g. posts, comments, photos, links, check-ins, etc.), managing of groups, managing different sharing and visibility levels, updating the social graph, etc. For example, the social network engine 205 registers the user 125 by receiving information such as a username and password and generates a user profile that is associated with the user 125. In some instances, the user profile includes additional information about the user 125 including interests (e.g. soccer, reading, food), activities (e.g. search history, indications of acknowledgement, shared posts, unique posts, comments) and demographics (e.g. location). In other instances, the user profile includes at least one achievement badge received from the incentivizing module 211 described in more detail below including a graphical progress bar that indicates progress toward receiving one or more achievement badges.

In some instances, the social network engine 205 receives indications of acknowledgement associated with at least one information item from a first user and at least one second user at the social network. The first user and the at least one second user can be connected on the social network. The at least one information item includes a search engine result, an advertisement, a text-based post, a website, a webpage, an article, an image, a video file and an audio file. In some instances, the information item may be shared to the social network by the first user, explicitly classified as belonging to a topic and receive indications of acknowledgement from the at least one second user clicking on an icon of the indication of acknowledgement (acknowledgement button) associated with the shared information item. For example, the first user may embed hash-tags associated with the topic while sharing the information item to the social network. In other instances, the social network engine 205 searches for and analyzes keywords, page description tags, title tags and other metadata embedded in the shared information item to implicitly determine the topic associated with the information item and classifies it accordingly. The social network engine 205 transmits instructions to the user interface engine 213 to generate a user interface that includes information associated with the information item that is being shared to the social network including a picture or a thumbnail, a title and a summary of the information item extracted from a website hosting the information item. The indications of acknowledgement received from the first user and the at least one second user are transmitted to the aggregating module 207 for aggregating the indications of acknowledgement.

In some instances, the social network engine 205 receives search terms or links to websites from a search engine 143 and searches the social network to identify users that provided indications of acknowledgement associated with the search terms or links. The social network engine 205 provides the search engine 143 with information about the users, for example, a number of users that provided the indications of acknowledgement. In the instance where the user consents to the use of such data, the social network engine 205 provides the search engine 143 with the identity of the users that provided the indications of acknowledgement. In some instances, the social network engine 205 provides the identity of the other users to the search engine 143 if the other users have a close relationship to the first user in the social graph. For example, a first user searches for "Arches National Park" using a search server 135. The search engine 143 at the search server 135 transmits the identity of the first user and the search terms "Arches National Park" to the social network engine 205. The social network engine 205 identifies other users that provided an indication of acknowledgement for websites about Arches National Park. In the instance where the user consents to the use of such data, the social network engine 205 transmits the identity of the other users to the search engine 143, which generates a search results page that includes the number of users that provided the indications of acknowledgement for different websites and their identities to the first user.

In some instances, the social network engine 205 receives indications of acknowledgement associated with at least one live event from the users 125 physically providing indications of at the venue of the live event. For example, a physical indication of acknowledgment button can be installed at a trade show and users can indicate acknowledgments at each presentation booth in the trade show by pressing the physical indication of acknowledgement button. The users 125 can be authenticated to provide physical indications of acknowledgement via the user authentication module 203 which reads a radio-frequency identification (RFID) tag embedded in the user devices 115. In other instances, the social network engine 205 receives indications of acknowledgement associated with at least one physical entity captured and analyzed for identification through an image recognition application present on the user device 115. The at least one physical entity can include a landmark, a painting, a product, a barcode, a natural phenomenon, a printed text, an animal and a plant. For example, the users 125 can take pictures of different products (e.g. cars, boats, books, manufacturer logos, beverages, comics etc.) present at the trade show to indicate acknowledgement of the different products at the social network. In yet other instances, the social network engine 205 receives indications of acknowledgement on the at least one information item retrieved by the search server 135 in response to the image recognition application identifying the captured image of the physical entity received via the user device 115.

The aggregating module 207 can be software including routines for aggregating indications of acknowledgement received at the social network. In some instances, the aggregating module 207 may be a set of instructions executable by the processor 235 to provide the functionality described below for aggregating the indications of acknowledgement. In other instances, the aggregating module 207 may be stored in the memory 237 of the computing device 200 and can be accessible and executable by the processor 235. In either of the instances, the aggregating module 207 can be coupled to the bus 220 for communication with the processor 235, the storage device 131 and other components of the computing device 200 via signal line 228.

In some instances, the aggregating module 207 aggregates the indications of acknowledgement associated with the at least one information item from the first user and the at least one second user at the social network for the purpose of storing the indications of acknowledgement in the storage device 131. For example, the aggregation module 207 receives approval of a webpage with a search engine from the first user and the at least one second user who might be connected to the first user or otherwise associated with the social network, while searching for a topic. In other instances, the aggregating module 207 retrieves from the social network engine 205 at least a timestamp and a user location associated with each of the indications of acknowledgement and stores them in the storage device 131. The timestamp could be the date or time at which the acknowledgement was indicated. The user location can be a geographical position of the user device associated with the indication of acknowledgment provided by the user 125 that is identified using cellular positioning, Wi-Fi positioning or a global positioning system (GPS). In some instances, the user location identified can be limited to the city alone.

In some instances, the aggregating module 207 aggregates the first user's indications of acknowledgement on at least one information item associated with at least one topic. For example, the first user selects a clickable button for providing an indication of acknowledgement on one or more articles related to rock climbing. In other instances, the aggregating module 207 aggregates the indications of acknowledgement that the first user receives from the at least one second user on the at least one information item associated with the at least one topic shared to the social network. For example, the aggregating module 207 receives indications of acknowledgement on one or more articles related to rock climbing on behalf of a first user from other users who are connected to the first user on the social network.

The processing module 209 can be software including routines for processing the aggregated indications of acknowledgement for the one or more information items. In some instances, the processing module 209 may be a set of instructions executable by the processor 235 to provide the functionality described below for processing the aggregated indications of acknowledgement. In other instances, the processing module 209 may be stored in the memory 237 of the computing device 200 and can be accessible and executable by the processor 235. In either of the instances, the processing module 209 can be coupled to the bus 220 for communication with the processor 235, the storage device 131 and other components of the computing device 200 via signal line 230.

In some instances, the processing module 209 generates a graph plotting total number of indications of acknowledgement received over time for the one or more information items. The graph visualizes the viewing statistics associated with the information item. In other instances, the processing module 209 generates a geographical map that includes at least one geographical position associated with the indications of acknowledgement received for the one or more information items. The processing module 209 accesses the indications of acknowledgement in the storage device 131 or receives the indications of acknowledgement directly and analyzes the timestamp and user location information associated with each of the indications of acknowledgement to generate the graph and the geographical map. The processing module 209 transmits instructions to the user interface engine 213 to generate graphical data that includes at least one of the graph and the geographical map in response to the first user and/or the at least one second user moving an arrow to hover over the icon for the indication of acknowledgement. For example, when a user moves an arrow to hover over the button for providing an indication of acknowledgement for a search engine result, the search engine results page displays the graph of viewing statistics and the geographical map representing distinct locations of individual users who provided indications of acknowledgment for the search engine result subject to those individual users consenting to the use of such data. In other instances, the geographical map generated by the processing module 209 includes only the location of the at least one second user who is directly connected to the first user on the social network (e.g. the second user and the first user follow each other).

In some instances, the processing module 209 transmits instructions to the user interface engine 213 to generate a user interface that transforms the indication of acknowledgment received from the first user to appear as part of an anonymous aggregated count of users 125 who provided indications of acknowledgement on the at least one information item. In other instances, the indications of acknowledgement received from the first user appear as part of the social network profile associated with the first user. For example, a special tab on the profile page can display the indications of acknowledgement as and when they are provided by the first user. The special tab can be made publicly accessible on the profile page.

The incentivizing module 211 can be software including routines for incentivizing user engagement in aggregating indications of acknowledgement. In some instances, the incentivizing module 211 may be a set of instructions executable by the processor 235 to provide the functionality described below for incentivizing user engagement. In other instances, the incentivizing module 211 may be stored in the memory 237 of the computing device 200 and can be accessible and executable by the processor 235. In either of the instances, the incentivizing module 211 can be coupled to the bus 220 for communication with the processor 235, the storage device 131 and other components of the computing device 200 via signal line 232.

The incentivizing module 211 edits and stores game design rules as gamification information included in the storage device 131. The game design rules can be the rules used to make indications of acknowledgement more engaging for the users 125. In some instances, the incentivizing module 211 rewards the first user by distributing at least one numerical point for indicating an acknowledgement on the at least one information item associated with the at least one topic at the social network. For example, providing an indication of acknowledgment at the social network on a rock climbing article published on a newspaper website earns the first user one numerical point. In other instances, the incentivizing module 211 rewards the first user at least one numerical point for receiving an indication of acknowledgement or a re-share on the at least one information item associated with the at least one topic (shared to the social network) from the at least one second user. For example, when a first user shares a video on rock climbing to the social network, the incentivizing module 211 distributes one numerical point to the first user when one second user (connected to the first user or otherwise) on the social network provides an indication of acknowledgement associated with the shared video or re-shares the video. In other instances, the incentivizing module 211 distributes at least one numerical point to a user responsive to the user providing the indication of acknowledgement.

The incentivizing module 211 distributes an achievement badge for a topic to a user for accumulating at least one threshold of a total number of points associated with at least one topic. The at least one achievement badge can be a virtual representation of becoming knowledgeable on the at least one topic and can be displayed on the social network profile page associated with the first user. In some instances, the at least one achievement badge can indicate the status or expert level of the first user associated with the at least one topic. For example, securing an "Expert" achievement badge by accumulating 100 numerical points and securing a "Veteran" achievement badge by accumulating 1000 numerical points. In some other instances, the incentivizing module 211 generates an achievement badge for providing a threshold number of indications of acknowledgement and/or re-shares of content. For example, the incentivizing module 211 generates a super user badge when the user provides over 100 indications of acknowledgement or shares over 10 things.

The incentivizing module 211 transmits instructions to the user interface engine 213 to generate a user interface that displays a graphical progress bar to granularly indicate progress toward reaching the threshold of a total number of points associated with the at least one achievement badge. The graphical progress bar can be visible to the at least one second user visiting the social network profile page associated with the first user. In other instances, the first user receives additional rewards for exceeding a threshold number of points. For example, a business rewards a user that controls a business profile page with a monetary credit once the user accumulates 100 points from indications of acknowledgments on the associated business profile page on the social network for $10 of advertisement credits to market the business website on an advertising network.

In some instances, the incentivizing module 211 incentivizes user engagement by transmitting instructions to the user interface engine 213 to generate a user interface that includes a first counter on a social network profile associated with the first user for a number of indications of acknowledgment received for the at least one information item shared to the social network by the first user from the at least one second user and a second counter for a number of times the at least one information item posted by the first user is being shared by the at least one second user on the social network. In other instances, the incentivizing module 211 lists a name and photo of the first user with the at least one achievement badge on the at least one information item associated with the topic to add credence to the at least one information item that is viewed by other users on the social network. For example, in the instance where the user consents to the use of such data, the name and photo of the first user together with an indication of his/her expertise can appear on at least one search engine result associated with a rock climbing query. In other instances, the incentivizing module 211 uses feedback to encourage users to add more indications of acknowledgement to information items by informing users of how many times information items that they created received indications or acknowledgement or were reshared, and how many times their indications of acknowledgement appeared in association with content items. For example, if the search engine results include the name of the first user as an expert for indications of acknowledgment from the at least one second user, the incentivizing module 211 can inform the first user about the number of times the first user's indications of acknowledgment appeared in the search results.

The user interface engine 213 can be software including routines for generating a user interface that receives indications of acknowledgement from users 125 and/or displays information associated with the indications of acknowledgement to the users 125 via the communication unit 241. The user interface can be transmitted and displayed on a user device 115, for example, a mobile device or a desktop computer. In some instances, the user interface engine 213 can be a set of instructions executable by the processor 235 to provide the functionality described below for receiving indications of acknowledgement from users 125 and/or displaying information associated with the indications of acknowledgement to the users 125. In other instances, the user interface engine 213 can be stored in the memory 237 of the computing device 200 and can be accessible and executable by the processor 235. In either of the instances, the user interface engine 213 can be coupled to the bus 220 for communication with the processor 235 and other components via signal line 234.

Figure 3A:
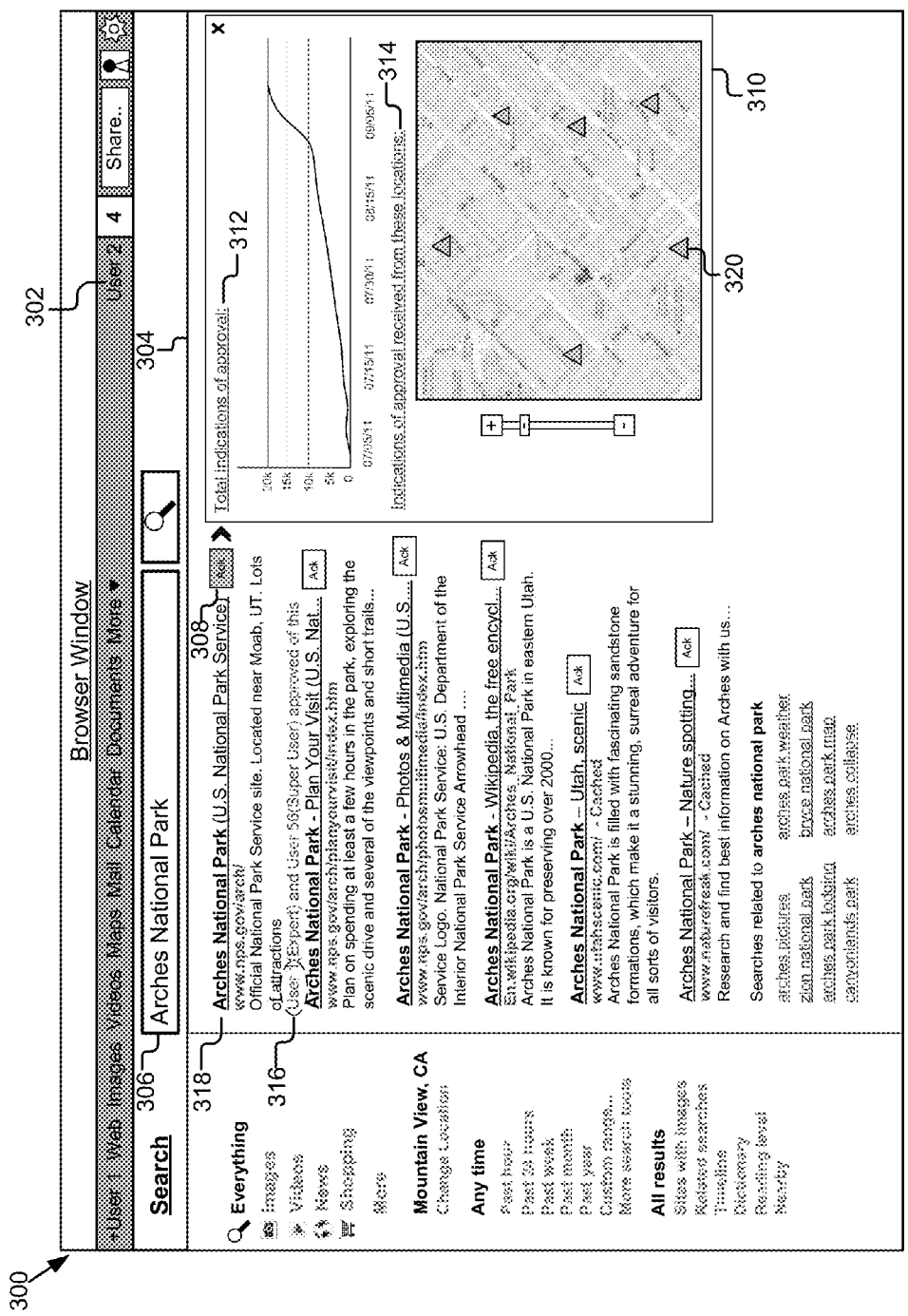
FIG. 3A is a graphic representation of an example user interface for displaying information associated with an indication of acknowledgement on an information item.

Turning now to user interface engine 213, FIG. 3A is a graphic representation 300 of an example user interface that is generated by the user interface engine 213 for displaying information associated with an indication of acknowledgement on an information item in response to hovering over the acknowledgment button. In this example, the graphic representation 300 displays a search engine results page 304 that is retrieved in response to a query 306 input by a second user 302. In some instances, the second user 302 can be connected to the first user 316 on a social network via the social graph. An indication of acknowledgment button 308 associated with at least one search engine result 318 is listed on the search engine results page 304 for providing an indication of acknowledgement. In some instances, in response to the second user 302 employing a mouse or other device to make an arrow hover over the indication of acknowledgement button 308, the user interface can include a visual overview 310 of the information associated with the indications of acknowledgement. The visual overview 310 includes a graph 312 plotting the total number of indications of acknowledgement associated with the search engine result 318 as a function of time and a geographical map 314 mapping at least the geographical position 320 of the first user 316 and a super user who approved of the search engine result 318. In the instance where the user contents to the use of such data, the search engine result 318 can be annotated with the name of the first user 316 and his or her expertise (or achievement badges) in the topic to add credence to the search engine result 318 since the first user 316 provided an indication of acknowledgement on the search engine result 318.

Figure 3B:
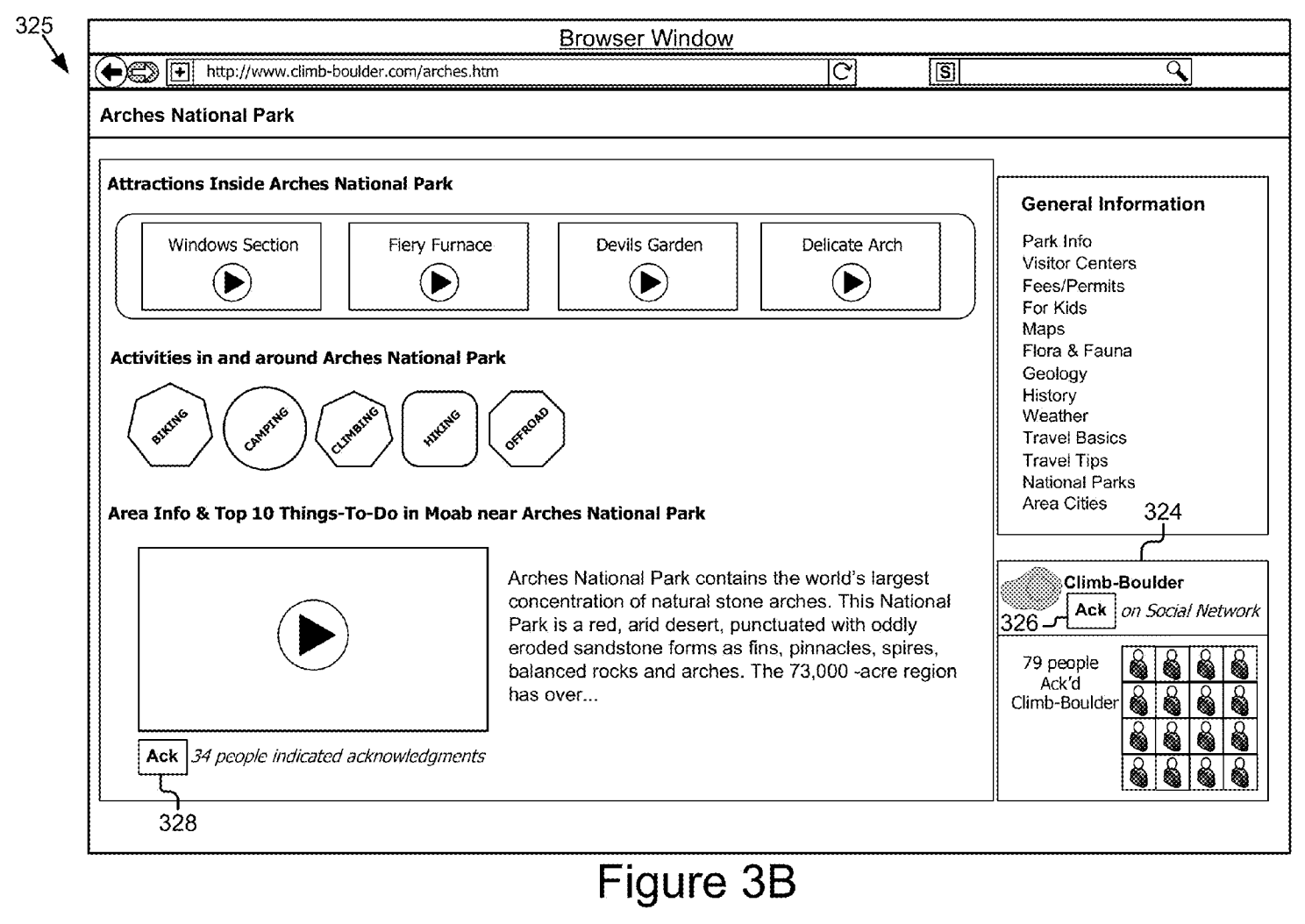

FIG. 3B is a graphic representation 325 of an example user interface that is generated by a website module on a third-party server that employs the snippet 151 for displaying information about indications of acknowledgement for a group on the social network with a topic related to the topic of the website generated by the website module. In this example, the graphic representation 325 displays an acknowledgement box 324 including a first acknowledgement button 326 for indicating acknowledgement of a group on the social network with a topic that is similar to the third-party website about Arches National Park. In some instances, the acknowledgment box 324 can include an aggregated count of the users who have provided indications of acknowledgement of the group on the social network. In other instances, the third-party website can incorporate at least one second acknowledgement button 328 for providing indications of acknowledgement for one or more information items on the third-party website.

Figure 3C:
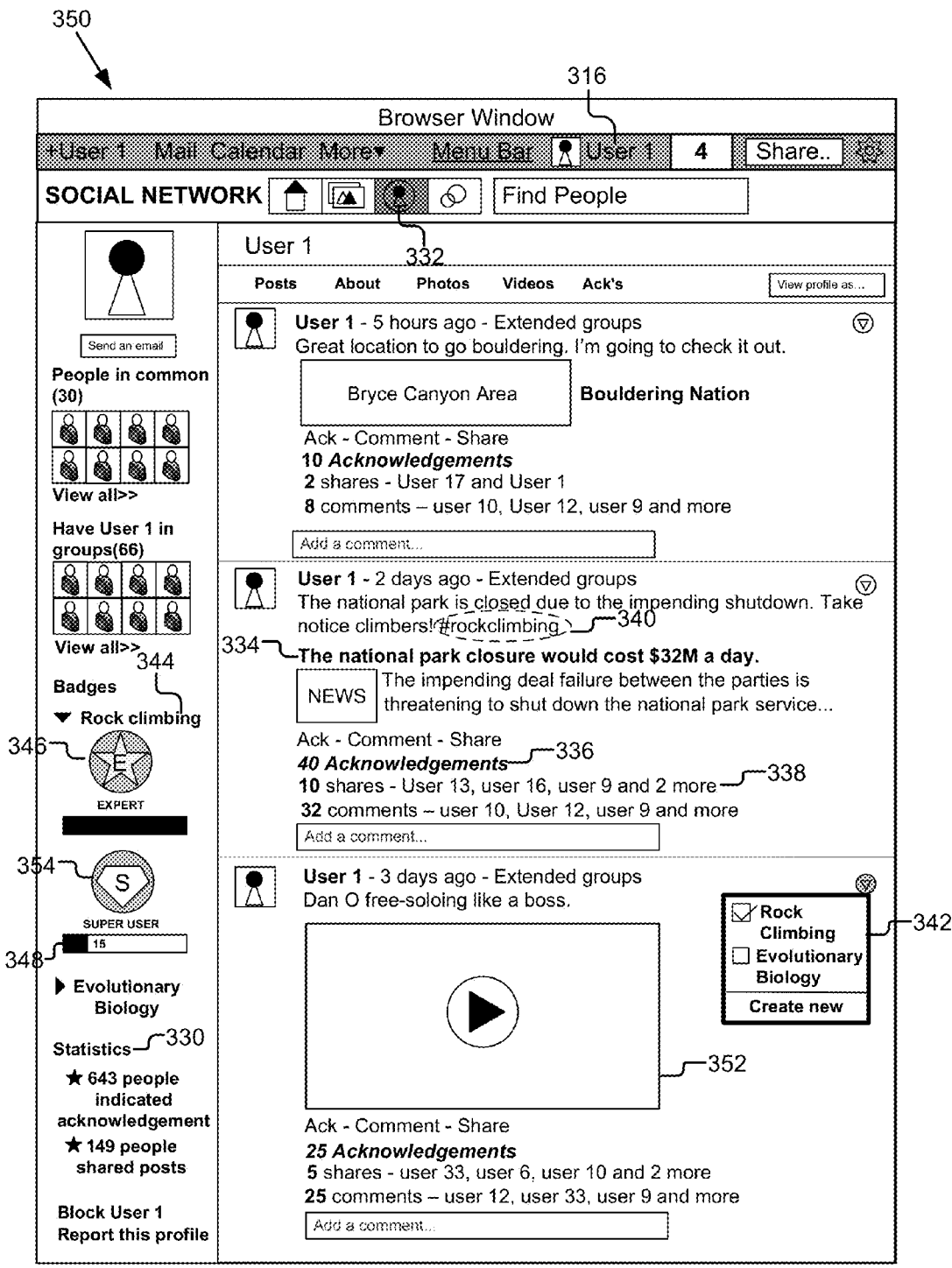
FIG. 3C is a graphic representation of an example user interface for displaying the social network profile page associated with a user.

FIG. 3C is a graphic representation 350 of an example user interface that is generated by the user interface engine 213 for displaying the social network profile page associated with a user. In this example, the graphic representation 350 displays a profile page 332 associated with a first user 316. In some instances, the first user 316 shares a post 334 associated with rock climbing 344 and receives indications of acknowledgement 336 from 40 other users. The post 334 can include the number of shares 338 it accumulated on the social network in order to incentivize the first user to share more posts. In some instances, the first user 316 can include hash-tags 340 to classify the post 334 as belonging to the category of rock climbing 344 (topic). In other instances, the first user 316 can classify a video 352 as belonging to the category rock climbing 344 by choosing the rock climbing checkbox in the drop down menu 342 associated with the video 352. The profile page 332 includes a first achievement badge 346 earned by the first user 316 by providing indications of acknowledgement about rock climbing, receiving indications of acknowledgement and sharing articles associated with the category rock climbing 344 at the social network. In some instances, the profile page 332 includes a progress bar 348 indicating the completion status toward securing a second achievement badge 354 (higher level achievement badge) for providing a large number of indications of acknowledgement and re-shares. In other instances, the profile page 332 includes a statistics section 330 associated with the first user 316. The statistics section 330 include a first counter for a number of indications of acknowledgement received for information items provided by the first user 316 and a second counter for a number of times the information items provided by the first user 316 were shared by his or her connections on the social network.

Figure 3D:
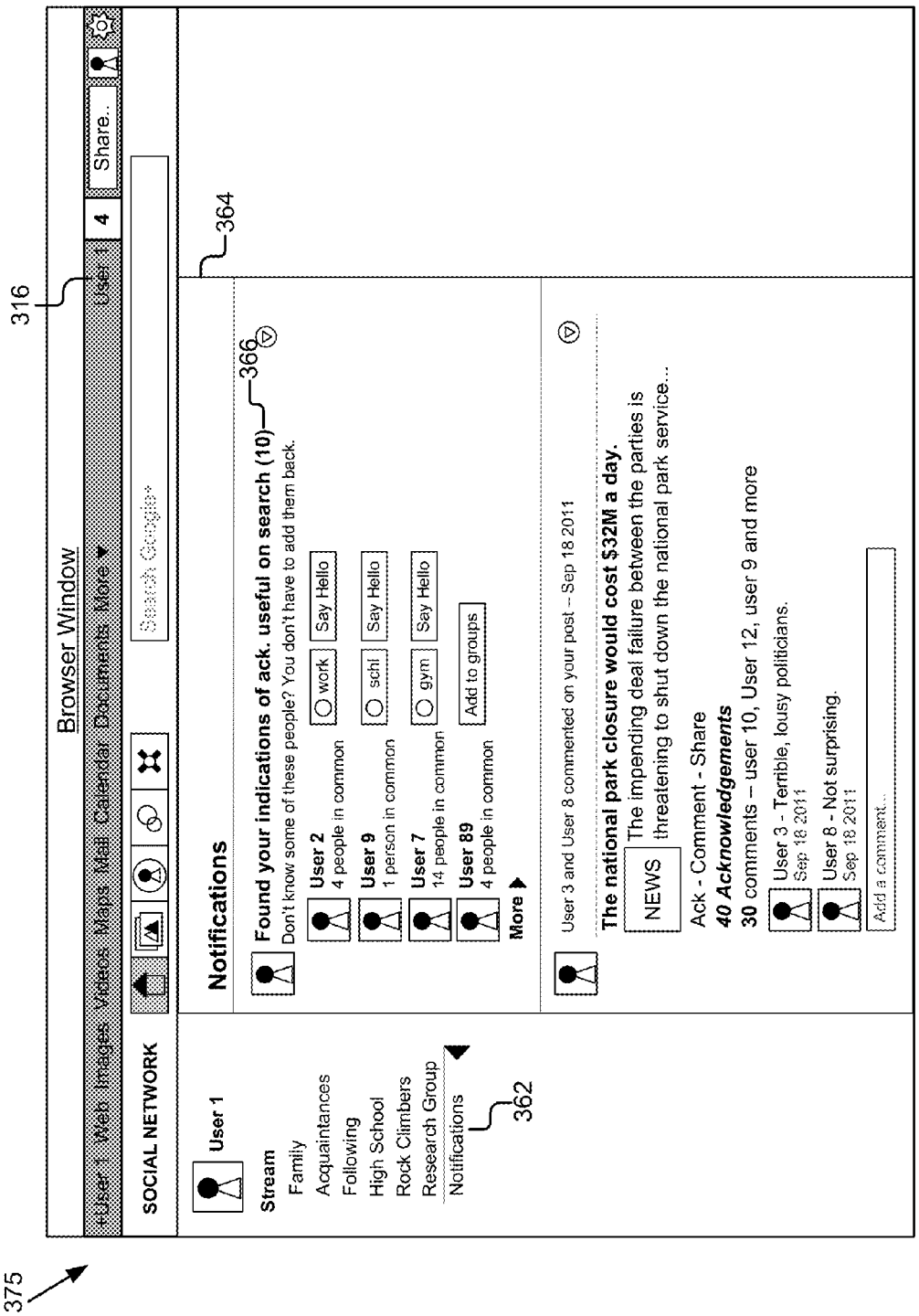
FIG. 3D is a graphic representation of an example user interface for communicating feedback to a user associated with an indication of acknowledgement.

FIG. 3D is a graphic representation 375 of an example user interface that is generated by the user interface engine 213 for communicating feedback to the user associated with the indications of acknowledgement. In this example, the graphic representation 375 displays a notification stream for the first user 316 on the social network. The first user 316 selects the notifications link 362, the sub-window 364 refreshes to display feedback 366 associated with at least one acknowledgement made by the first user 316. The feedback 366 can be received when one or more connections of the first user 316 find the name of the first user 316 annotated with the search engine result and provide indications of acknowledgement on the search engine result. In the instance where the users consent to the use of such data, the feedback 366 includes information about the users that provided feedback including the connection shared between the users and the first user 316. For example, the first user 316 is connected to User 2 through a work group.

In some instances, data can be stored in the memory 237 of the computing device 200, further described in conjunction with FIG. 2, so that execution of the data by the processor 235 included in the computing device 200 causes execution of the functionality described below in conjunction with FIGS. 4, 5 and 6.

Figure 4:
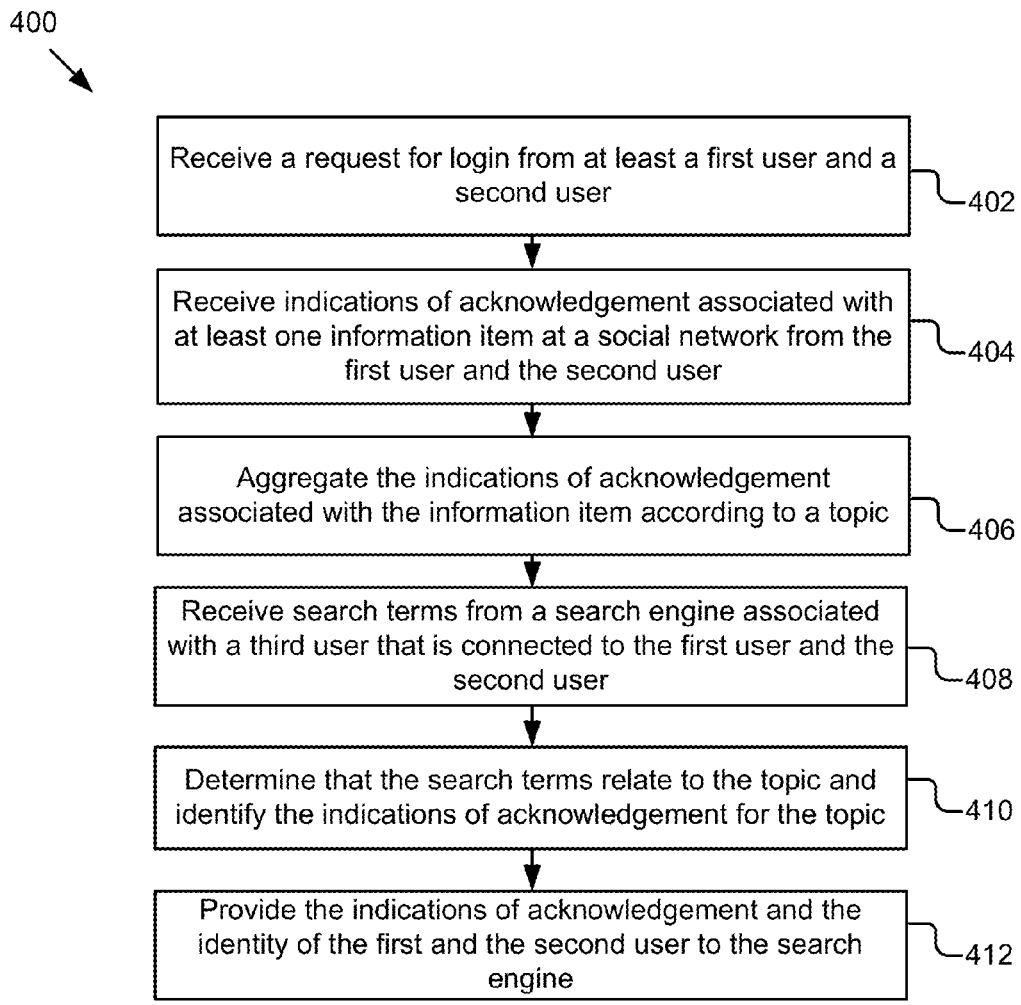
FIG. 4 is a flowchart of an example method for aggregating, processing and providing information associated with indications of acknowledgement.

FIG. 4 is a flowchart 400 of an example method for aggregating, processing and providing information associated with indications of acknowledgement. The user authentication module 203 receives 402 a request for login from at least a first user and a second user. The social network engine 205 receives 404 indications of acknowledgement associated with at least one information item at a social network from the first user and the second user. The aggregating module 207 aggregates 406 the indications of acknowledgement associated with the information item relating to a topic. For example, the aggregating module 207 aggregates indications of acknowledgement for webpages about Arches National Park to the topic of Arches National Park.

The social network engine 205 receives 408 search terms from a search engine 143 associated with a third user that is connected to the first user and the at least one second user. For example, the social network engine 205 receives "Arches National Park" search terms from the third user. The third user is connected to the first user and the second user, for example, because third user placed the first user into a photography group and the second user into a work friends group. In some instances, information about the indications of acknowledgement provided by the first and second users is contingent upon the first and second users following the third user. The social network engine 205 determines 410 that the search terms relate to the topic and identifies the indications of acknowledgement for the topic. For example, the social network engine 205 determines that the search terms relate to Arches National Park and identifies the websites for which the first user and the second user provided indications of acknowledgement for Arches National Park.

The social network engine 205 provides 412 the indications of acknowledgement and the identity of the first and the second user to the search engine 143. The search engine 143 incorporates the indications of acknowledgement into the search results. For example, the search engine 143 generates graphical data for showing that the first user and the second user provided indications of acknowledgement for a webpage about Arches National Park.

Figure 5:
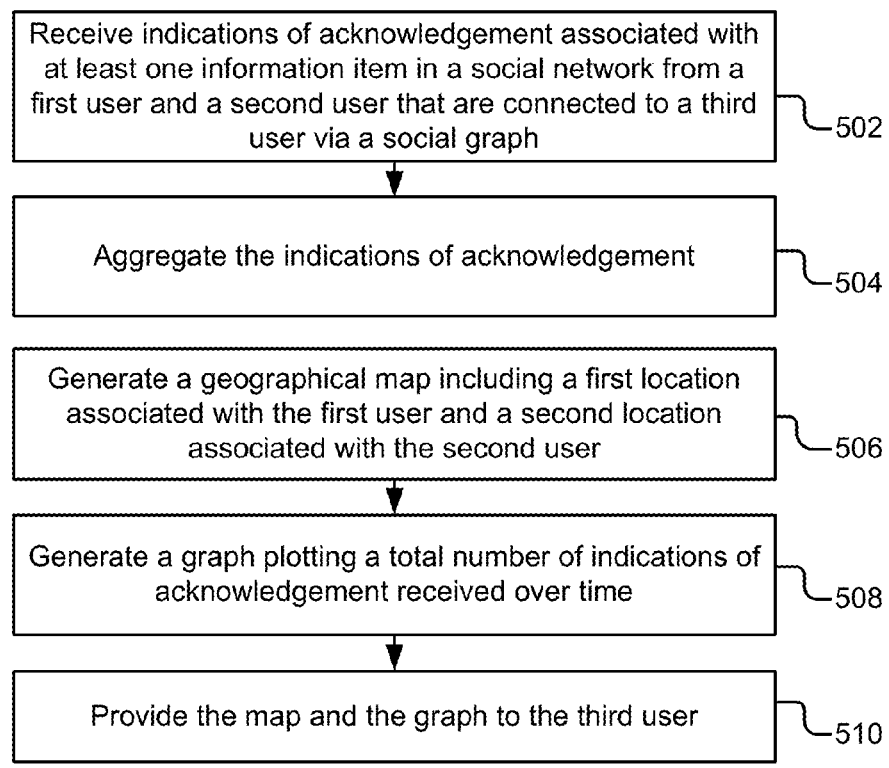
FIG. 5 is a flowchart of an example method for processing the information associated with indications of acknowledgement.

FIG. 5 is a flowchart 500 of an example method for processing the information associated with indications of acknowledgement. The social network engine 205 receives 502 indications of acknowledgement associated with at least one information item at a social network from a first user and a second user that are connected to a third user via a social graph. The first and second users provide permission for their user data to be used by the social network engine 205. For example, the first and second users set a visibility level where users can see their indications of acknowledgement if they follow that user and otherwise the information remains private.

The aggregating module 207 aggregates 504 the indications of acknowledgement from the first user and the second user. The processing module 209 processes the indications of acknowledgement by generating 506 a geographical map including a first location associated with the first user and at a second location associated with the second user. In some instances, the locations are for towns and not street addresses. The processing module 209 generates 508 a graph plotting a total number of indications of acknowledgement received over time. The processing module 209 instructs the user interface engine 213 to generate graphical data for displaying the geographical map and the graph. The user interface engine 213 provides 510 the geographical map and the graph to the third user. In some instances, the user interface engine 213 provides a user interface that displays the geographical map and the graph in response to a user's mouse hovering over an option for the indications of acknowledgement associated with the at least one information item.

Figure 6:
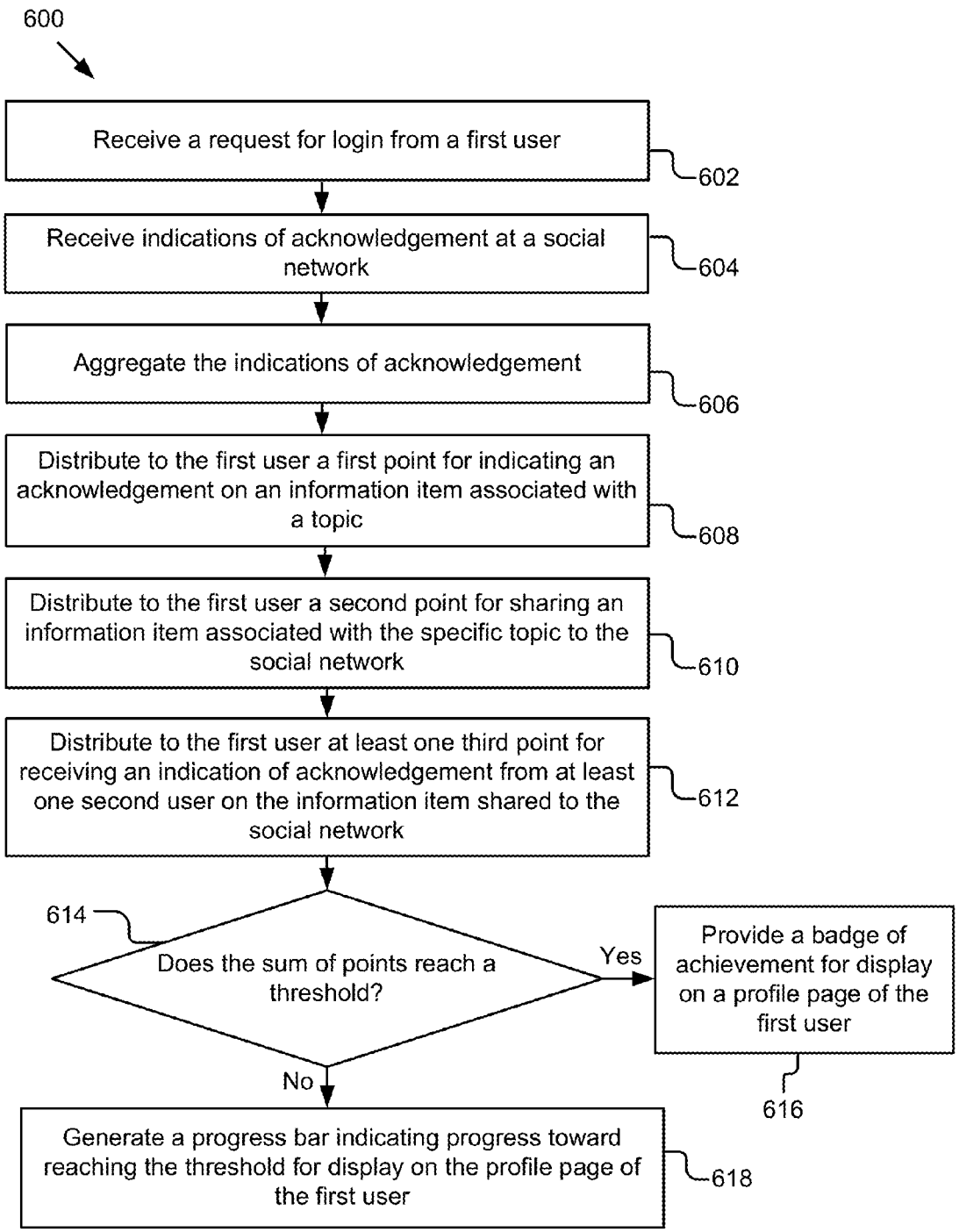
FIG. 6 is a flowchart of an example method for incentivizing a user to provide indications of acknowledgement.

FIG. 6 is a flowchart 600 of an example method for incentivizing a user to provide indications of acknowledgement. The user authentication module 203 receives 602 a request for login from a first user. The social network engine 205 receives 604 indications of acknowledgement at a social network. The aggregating module 207 aggregates 606 the indications of acknowledgement. The incentivizing module 211 distributes 608 to the first user a first point for indicating an acknowledgement on an information item associated with a topic, distributes 610 to the first user a second point for sharing an information item associated with the topic to the social network and distributes 612 to the first user at least one third point for receiving an indication of acknowledgement from at least one second user on the information item shared to the social network. The incentivizing module 211 determines 614 whether the sum of points has reached a threshold. Thus, if the threshold is reached, the incentivizing module 211 provides 616 a badge of achievement for displaying on a profile page of the social network associated with the first user. This serves as a reward that encourages the user to continue interacting with the social network. If the sum of points has not reached a threshold, the incentivizing module 211 generates 618 a progress bar indicating the progress toward reaching the threshold for displaying on the profile page of the social network associated with the first user.

In the above description, for purposes of explanation, numerous specific details are set forth in order to provide a thorough understanding of the specification. The instances presented in this description can be practiced without these specific details. In other instances, structures and devices are shown in block diagram form in order to avoid obscuring the specification. For example, the specification is described in some instances above with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions are presented in terms of algorithms and symbolic representations of operations on data bits within a computer memory. These algorithmic descriptions and representations are the means used to most effectively convey the substance of the work. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some instances can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some instances can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description. In addition, the specification is not described with reference to any particular programming language. It will be appreciated that a variety of programming languages may be used to implement the teachings of the various instances as described herein.

The foregoing description of the instances of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, the modules, routines, features, attributes, methodologies and other aspects of the disclosure can be implemented as software, hardware, firmware or any combination of the three. Also, wherever a component, an example of which is a module, of the specification can be implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
    receiving, at a social network, indications of acknowledgment associated with at least one information item from at least a first user and a second user, the at least one information item related to a topic;
    aggregating the indications of acknowledgment associated with the at least one information item from at least the first user and the second user according to the topic;
    receiving search terms from a third user that correspond to the topic;
    providing the at least one information item retrieved as a search result matching the search terms and including the aggregated indications of acknowledgement to the third user; and
    providing to the first user a number of times that the indication of acknowledgement from the first user appeared in association with the at least one information item retrieved as the search result matching the search terms from the third user that correspond to the topic.

2. The method of claim 1, wherein the search terms are received from a search engine and responsive to the search engine receiving the indications of acknowledgement, the search engine generating search results that include the indications of acknowledgement.

3. The method of claim 1, wherein the first user and the second user are followed by the third user according to a social graph and wherein the indications of acknowledgement provided to the third user include an identity of the first user and the second user.

4. The method of claim 1, further comprising:
    generating a geographical map including at least a first location associated with the first user and a second location associated with the second user giving the indications of acknowledgment; and
    generating a graph plotting a total number of indications of acknowledgment received from the first user and the second user over time.

5. The method of claim 1, further comprising:
    distributing, at the social network, at least one point to the first user based on the indications of acknowledgment from the first user and sharing of the at least one information item relating to the topic to the social network; and
    providing at least one badge of achievement to the first user based on reaching at least one threshold of a total number of points.

6. The method of claim 5, wherein distributing at least one point to the first user based on the indications of acknowledgment is responsive to receiving the indications of acknowledgment from the first user for the at least one information item relating to the topic.

7. The method of claim 5, wherein distributing at least one point to the first user based on the indications of acknowledgement is responsive to receiving the indications of acknowledgment on the at least one information item shared to the social network from the at least one second user.

8. The method of claim 5, further comprising providing for display on a social network profile page associated with the first user at least one badge of achievement and a graphical progress bar that indicates progress toward reaching the at least one threshold of a total number of points.

9. The method of claim 5, further comprising providing for display on a social network profile page associated with the first user a first counter for a number of indications of acknowledgment received from the second user and a second counter for a number of times the at least one information item posted by the first user is being shared by the second user on the social network.

10. The method of claim 5, further comprising identifying a name of the first user in proximity to the at least one information item relating to the topic based on the at least one badge of achievement received by the first user.

11. The method of claim 5, further comprising the first user exchanging the at least one threshold of a total number of points accumulated for a virtual reward.

12. The method of claim 1, wherein the indication of acknowledgement from the first user is received from the first user providing a physical indication of acknowledgement.

13. A system comprising:
    one or more processors;
    a memory storing instructions executable by the one or more processors, the one or more processors being configured to:
        receive, at a social network, indications of acknowledgement associated with at least one information item from a first user and a second user, at least one information item related to a topic;
        aggregate the indications of acknowledgement associated with the at least one information item from at least the first user and the second user according to the topic;
        receive search terms from a user that corresponds to the topic;
        provide the at least one information item retrieved as a search result matching the search terms and including the aggregated indications of acknowledgement to the third user; and
        provide to the first user a number of times that the indications of acknowledgement from the first user appeared in association with the at least one information item retrieved as the search result matching the search terms from the third user that correspond to the topic.

14. The system of claim 13, wherein the one or more processors are further configured to:
generate a geographical map including at least a first location associated with the first user and at least one second location associated with the second user giving the indications of acknowledgment; and
generate a graph plotting a total number of indications of acknowledgment received from the first user and the second user over time.

15. A system of claim 13, wherein the one or more processors are further configured to distribute, at the social network, at least one point to the first user based on the indications of acknowledgment from the first user and sharing of the at least one information item relating to the topic to the social network and providing at least one badge of achievement to the first user based on reaching at least one threshold of a total number of points.

16. The system of claim 15, wherein distributing at least one point to the first user based on the indications of acknowledgment is responsive to receiving the indications of acknowledgment from the first user for the at least one information item relating to the topic.

17. The system of claim 15, wherein distributing at least one point to the first user based on the indications of acknowledgement is responsive to receiving the indications of acknowledgment on the at least one information item shared to the social network from the second user.

18. A computer program product comprising a non-transitory computer readable medium encoding instructions that, in response to execution by a computing device, cause the computing device to perform operations comprising:
receiving, at a social network, indications of acknowledgment associated with at least one information item from a first user and a second user, the at least one information item related to a topic;
aggregating the indications of acknowledgment associated with the at least one information item from at least the first user and the second user relating to the topic;
receiving search terms from a third user that correspond to the topic;
providing the at least one information item retrieved as a search result matching the search terms and including the aggregated indications of acknowledgement to the third user; and
providing to the first user a number of times that the indication of acknowledgement from the first user appeared in association with the at least one information item retrieved as the search result matching the search terms from the third user that correspond to the topic.

19. The computer program product of claim 18, further comprising:
generating a geographical map including at least a first location associated with the first user and at least one second location associated with the second user giving the indications of acknowledgment; and
generating a graph plotting a total number of indications of acknowledgment received from the first user and the second user over time.

20. The computer program product of claim 18, further comprising:
distributing, at the social network, at least one point to the first user based on the indications of acknowledgment from the first user and sharing of the at least one information item relating to the topic to the social network; and
providing at least one badge of achievement to the first user based on reaching at least one threshold of a total number of points.

* * * * *